United States Patent
Vogler et al.

(10) Patent No.: US 9,446,645 B2
(45) Date of Patent: Sep. 20, 2016

(54) CONTROL ARM BASE

(71) Applicant: Schaeffler Technologies GmbH & Co. KG, Herzogenaurach (DE)

(72) Inventors: Tobias Vogler, Herzogenaurach (DE); Raphael Fischer, Herzogenaurach (DE); Nicole Denzler, Erlangen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/418,020

(22) PCT Filed: Jul. 10, 2013

(86) PCT No.: PCT/DE2013/200032
§ 371 (c)(1),
(2) Date: Jan. 28, 2015

(87) PCT Pub. No.: WO2014/019575
PCT Pub. Date: Feb. 6, 2014

(65) Prior Publication Data
US 2015/0191065 A1    Jul. 9, 2015

(30) Foreign Application Priority Data

Aug. 1, 2012  (DE) .................. 10 2012 213 524

(51) Int. Cl.
*B60G 3/06* (2006.01)
*B60G 7/00* (2006.01)
*B60G 7/02* (2006.01)

(52) U.S. Cl.
CPC . *B60G 7/02* (2013.01); *B60G 3/06* (2013.01); *B60G 7/001* (2013.01); *B60G 7/005* (2013.01);

(Continued)

(58) Field of Classification Search
CPC ........ B60G 7/001; B60G 7/005; B60G 7/02; B60G 3/06; B60G 2204/143; B60G 2204/30; B60G 2204/4302; B60G 2200/156; B60G 2200/18; B60G 2200/182; B60G 2206/124; Y10T 403/32541; Y10T 403/32606; Y10T 403/32631; Y10T 403/32721
See application file for complete search history.

(56) References Cited

U.S. PATENT DOCUMENTS 2,096,117 A * 10/1937 Leighton ................. B60G 7/02
280/124.134
2,122,476 A * 7/1938 Leighton ............... B60G 7/001
267/254

(Continued)

FOREIGN PATENT DOCUMENTS

CN    1704271    12/2005
CN    101084127  12/2007

(Continued)

*Primary Examiner* — Laura Freedman
(74) *Attorney, Agent, or Firm* — Davidson, Davidson & Kappel, LLC (57) ABSTRACT

A control arm base (30) for connecting a control arm (10), particularly a divided control arm, for a wheel (20) to a vehicle, which control arm (10) includes at least two partial control arms (11a, 11b) which can be connected on the one hand to a vehicle-side joint (32a, 32b) and on the other to a wheel-side joint (13, 13a, 13b, 13c). In order to realize a targeted influencing of the longitudinal and transverse rigidity of the control arm with simple conventional joints, the control arm base (30) includes at least two vehicle-connecting joints (31a; 31b) for articulated connection of the control arm base (30) to the vehicle, and at least two partial control arm connecting joints (32a, 32b) for the vehicle-side articulated connection of each of the partial control arms (11a, 11b) to the control arm base (30). The invention further relates to a wheel suspension that includes such a control arm base (30).

3 Claims, 5 Drawing Sheets

(52) U.S. Cl.
CPC ... *B60G 2200/156* (2013.01); *B60G 2200/422* (2013.01); *B60G 2200/44* (2013.01); *B60G 2204/143* (2013.01); *B60G 2204/15* (2013.01); *B60G 2204/30* (2013.01); *B60G 2204/4302* (2013.01); *B60G 2206/124* (2013.01); *Y10T 403/32541* (2015.01); *Y10T 403/32606* (2015.01); *Y10T 403/32631* (2015.01); *Y10T 403/32721* (2015.01)

(56) References Cited

U.S. PATENT DOCUMENTS

| | | | |
|---|---|---|---|
| 2,153,168 A | | 4/1939 | Broadman |
| 2,298,585 A | * | 10/1942 | Phelps ............. B60G 7/001 267/254 |
| 2,339,533 A | * | 1/1944 | Wahiberg ............ B60G 7/02 267/254 |
| 2,344,896 A | * | 3/1944 | Phelps ............... B60G 7/02 267/222 |
| 2,835,521 A | * | 5/1958 | White ............... B29C 43/00 264/137 |
| 2,996,311 A | * | 8/1961 | Thiry ................ B60G 7/00 280/124.104 |
| 3,006,627 A | | 10/1961 | Paulsen |
| 3,273,910 A | * | 9/1966 | Willingshofer ........ B60G 7/02 280/86.756 |
| 3,510,148 A | | 5/1970 | Wilfert |
| 5,005,859 A | * | 4/1991 | Satoh ............... B60G 11/183 188/130 |
| 5,921,568 A | * | 7/1999 | Cruise ............... B60G 11/23 267/279 |
| 7,661,688 B2 | | 2/2010 | Koumura |
| 8,448,965 B2 | * | 5/2013 | Fischer .............. B60G 3/26 280/124.134 |
| 2008/0111336 A1 | | 5/2008 | Aubarede et al. |
| 2009/0014977 A1 | * | 1/2009 | Molenaar ........... B60G 7/001 280/124.134 |

FOREIGN PATENT DOCUMENTS

| | | | |
|---|---|---|---|
| DE | 10 2006 026821 | 12/2007 | |
| DE | 102012203382 A1 * | 9/2013 | ............ B60G 3/06 |
| EP | 0301782 | 10/1989 | |
| EP | 1277603 | 1/2003 | |
| FR | 2 777 224 | 10/1999 | |
| JP | H02117470 | 5/1990 | |
| JP | H07251615 | 10/1995 | |

\* cited by examiner

Prior Art

CONTROL ARM BASE

The present invention relates to a control arm base for connecting a control arm, in particular a divided control arm, to a vehicle.

BACKGROUND

Conventional wheel suspensions, such as the MacPherson wheel suspension, generally include an undivided control arm having an asymmetrical shape, the control arm being connected to the wheel via a wheel-side joint and to the vehicle via two vehicle-side joints.

Since the transverse rigidity must preferably be high, the vehicle-side joint which is closer to the wheel-side joint, viewed in the vehicle longitudinal direction, must preferably have an inflexible design. For example, ball joints without any appreciable elastic elements are used for this purpose. To implement a certain elasticity in the longitudinal direction, an elastic flexure joint, a so-called rubber joint, is used for the other vehicle-side joint.

SUMMARY OF THE INVENTION

In a so-called divided control arm, which includes at least two partial control arms, which are connectable to a vehicle-side joint on the one hand and to a wheel-side joint on the other hand, and which are situated, for example, essentially side by side, a targeted influencing of the longitudinal and transverse rigidity of the control arm is difficult or scarcely possible to implement if the partial control arms are separately connected to the vehicle using simple, conventional joints.

It is an object of the present invention to provide a connecting means for a control arm, in particular a divided control arm, to a vehicle, which may be implemented using simple, conventional joints and which permits a targeted influencing of the longitudinal and transverse rigidity of the control arm.

The present invention provides a control arm base, which is designed to connect a control arm, in particular a divided control arm, to a vehicle, the control arm including at least two partial control arms, which are connectable to a vehicle-side joint on the one hand and to a wheel-side joint on the other hand and which are situated, for example, essentially side by side, the control arm base including at least two vehicle connecting joints for the articulated connection of the control arm base to the vehicle and at least two partial control arm connecting joints for the articulated connection of one each of the partial control arms to the control arm base, in particular, on the vehicle side. The partial control arm connecting joints act, in particular, as vehicle-side joints for the partial control arms. On the wheel side, the partial control arms may be connectable via a shared wheel-side joint or, separately from each other, via an (independent) wheel-side joint, which is also referred to below as a wheel connecting joint.

The control arm base has the advantage that the longitudinal and transverse rigidity of the control arm, in particular divided control arm, may be influenced in a targeted manner by the targeted positioning and selection of the vehicle connecting joints—similarly to conventional wheel suspensions—using simple, conventional joints and, as a result, a defined distribution of the transverse and longitudinal forces present at the control arm to the joints of the partial control arms may take place. The partial control arms in this case may be connected to the control arm base with the aid of a simple, for example, inflexible joint, for example, a ball joint. The control arm base is particularly suitable for control arms, in particular, divided control arms, which have an essentially mirror-symmetrical arrangement of the partial control arms, in particular, in which the mirror plane is perpendicular to the axis running through the vehicle-side joints and centrally between the vehicle-side joints, and/or which have one or multiple pivotable partial control arms. In control arms of this type, a control arm base is particularly advantageous, since a targeted influencing of the longitudinal and transverse rigidity of the control arm using conventional joints is scarcely possible to implement if the partial control arms are separately connected to the vehicle. The pivotable partial control arm(s) may be pivotable, in particular, around a pivot axis extending between the wheel-side and vehicle-side joints of the partial control arm. The pivotable partial control arm(s) may be designed, for example, to evade the wheel during a steering movement with the aid of a pivoting movement, and thereby increase the maximum steering angle of the wheel to, for example 90°, so that, for example, the turning clearance circle of a vehicle is significantly reduced and, for example, a maneuvering of a vehicle into and out of a parking space transversely to the regular driving direction of the vehicle is facilitated.

Within the scope of one preferred specific embodiment, at least one of the vehicle connecting joints is designed to be inflexible or rigid radially to the vehicle longitudinal direction. A certain transverse rigidity of the arrangement may thus be advantageously achieved.

Within the scope of another preferred specific embodiment, at least one of the vehicle connecting joints is flexible axially to the vehicle longitudinal direction. A certain movement or elasticity of the arrangement in the longitudinal direction may thus be implemented.

Within the meaning of the present invention, flexible may be understood to mean, in particular, that the joint is elastic and/or movable in the particular direction.

Within the scope of another specific embodiment, the radially inflexible vehicle connecting joint is also inflexible axially to the vehicle longitudinal direction. A certain longitudinal rigidity of the arrangement may thus be advantageously achieved. For example, a ball joint, in particular, without any appreciable elastic elements, may be used as the axially and radially inflexible vehicle connecting joint.

Within the scope of another specific embodiment, the radially inflexible vehicle connecting joint is flexible axially to the vehicle longitudinal direction. A certain movement or elasticity of the arrangement in the longitudinal direction may thus be advantageously implemented. For example, a sliding joint or a rotational sliding joint, in particular a sliding joint, may be used as the radially inflexible and axially flexible vehicle connecting joint, which, in particular, has no appreciable elastic element radially to the vehicle longitudinal direction, for example, a joint socket or joint guide, which is inflexible or inelastic radially to the vehicle longitudinal direction.

Within the scope of another specific embodiment, the axially flexible vehicle connecting joint is also flexible radially to the vehicle longitudinal direction. A certain torsion or elasticity of the arrangement in the longitudinal direction may thus be advantageously implemented. For example, an elastic flexure joint, a so-called rubber joint, may be used as the axially and radially flexible vehicle connecting joint.

However, it is also possible to use a joint having an elastic intermediate layer, for example, in the form of an elastic joint socket or joint guide, as the axially and radially flexible vehicle connecting joint. In particular, the axially and radially flexible vehicle connecting joint may be designed to be movable in parallel to the vehicle longitudinal axis. For example, the axially and radially flexible vehicle connecting joint may be a sliding joint or rotational sliding joint, in particular, a sliding joint, which is movable, in particular, axially to the vehicle longitudinal direction, in particular, including a joint socket or joint guide, which is elastic radially to the vehicle longitudinal direction.

Within the scope of another specific embodiment, the axially flexible vehicle connecting joint is inflexible radially to the vehicle longitudinal direction. A certain transverse rigidity of the arrangement may thus be advantageously achieved. For example, a sliding joint or a rotational sliding joint, in particular a sliding joint, may be used as the axially flexible and radially inflexible vehicle connecting joint, which, in particular, has no appreciable elastic element radially to the vehicle longitudinal direction, for example, a joint socket or joint guide, which is inflexible or inelastic radially to the vehicle longitudinal direction.

Due to a combination of an axially flexible and radially inflexible vehicle connecting joint or an axially and radially flexible vehicle connecting joint with a radially inflexible and axially flexible vehicle connecting joint, an elasticity or movability of the arrangement, and thus of the vehicle-side control arm connecting points in parallel to the vehicle longitudinal direction, may be advantageously facilitated, which has a favorable effect, in particular, on a load-optimized design of the control arm.

Thus, within the scope of one preferred embodiment, the radially inflexible vehicle connecting joint is flexible axially to the vehicle longitudinal direction, and the axially flexible vehicle connecting joint is inflexible or flexible radially to the vehicle longitudinal direction. In particular, the axially flexible vehicle connecting joint may be inflexible radially to the vehicle longitudinal direction.

Alternatively or in addition to an elastic joint design, for example, an elastic flexure joint or a joint having an elastic joint socket or joint guide, the elasticity of the arrangement may be adjusted with the aid of an additional elastic element, for example, a spring. In principle, it is possible for the control arm base to include one or multiple elastic elements axially to the vehicle longitudinal direction and one or multiple elastic elements radially to the vehicle longitudinal direction, for example, springs. The advantage of an additional elastic element in this case is that the elasticity of the additional elastic element may be set independently of the joints.

The control arm base preferably includes at least one joint or one additional elastic element, which is elastic axially to the vehicle longitudinal direction.

It is possible to implement the axial elasticity of the arrangement in this case with the aid of the axially flexible vehicle connecting joint, for example, in which an elastic flexure joint, a so-called rubber joint, or a joint having an elastic joint socket or joint guide, is used for this purpose, which is elastic, for example, axially or axially and radially to the vehicle longitudinal direction.

Within the scope of one special embodiment, an axial elasticity of the arrangement is ensured, however, in that the control arm base includes an element which is elastic axially to the vehicle longitudinal direction, in particular a spring. The advantage in this case is that the elasticity of the resilient element may be set independently of the joints.

The radially inflexible vehicle connecting joint may be designed as a sliding joint or rotational sliding joint, in particular a sliding joint, which is movable axially to the vehicle longitudinal direction, and the axially flexible vehicle connecting joint may be designed as a radially inflexible sliding joint or rotational sliding joint, in particular a sliding joint, which is movable axially to the vehicle longitudinal direction.

The axially elastic element may be situated, for example, on the axially flexible or radially inflexible vehicle connecting joint, in particular the axially flexible vehicle connecting joint. For example, the axially elastic element may be situated downstream from the axially flexible vehicle connecting joint or upstream from the radially inflexible vehicle connecting joint, in particular downstream from the axially flexible vehicle connecting joint, with respect to the forward driving direction of the vehicle.

The radially inflexible vehicle connecting joint may be, in particular, the front vehicle connecting joint with respect to the forward driving direction of the vehicle, and the axially flexible vehicle connecting joint may be, in particular, the rear vehicle connecting joint with respect to the forward driving direction of the vehicle.

The control arm base may include, in particular, a control arm base main body, which is provided with the vehicle connecting joints and the partial control arm connecting joints.

Since most joints have multiple parts and generally include as many components as needed to be connected with the aid of the joint, a joint may also be understood within the meaning of the present invention to be, in particular, only one joint part, for example, a joint socket/joint guide or a joint ball/joint bolt.

For example, a joint socket for forming a ball joint, including a joint ball formed on a partial control arm, may be provided on or in the control arm base as the partial control arm connecting joint, or, if necessary, vice versa. To form a ball joint-type vehicle connecting joint, a joint socket for forming a ball joint, including a joint ball formed on the vehicle, may be provided on or in the control arm base, or, if necessary, vice versa. To design a vehicle connecting joint in the form of a sliding joint or rotational sliding joint, the control arm base may be partially designed as a joint bolt, the vehicle being equipped with a joint guide for guiding the bolt, or, if necessary, vice versa.

The control arm base may be designed, in particular, in the shape of a plate or a beam. In particular, the control arm base may be a one-piece component. In principle, it is possible to form the control arm base partially from inflexible or inelastic materials and partially from elastic materials. However, it is also possible to form the control arm base exclusively from one or multiple inflexible materials, for example, metals.

The vehicle connecting joints and the partial control arm connecting joints may be situated, in particular, on the same axis.

The vehicle connecting joints may be situated, in particular on one side of the control arm base main body, and the partial control arm connecting joints may be situated on an opposite side of the control arm base main body.

The control arm base may be used for connecting a control arm, in particular a divided control arm, for a wheel, in particular a steered wheel, for example, a front wheel or a rear wheel, in particular a front wheel. In particular, the control arm base may be used to connect a control arm, in particular a divided control arm, for a wheel, in particular a steered wheel, which is driven by a wheel hub drive.

The vehicle may be, in particular, a passenger car, for example a city vehicle, in particular including a wheel hub drive, or, if necessary, a truck and/or a commercial vehicle.

Another subject matter of the present invention is a wheel suspension for a wheel, in particular a steered wheel, of a vehicle, which includes a control arm base according to the present invention and a control arm, in particular a divided control arm, including at least two partial control arms. For example, the wheel suspension may be a wheel suspension for a front wheel or a rear wheel. In particular, the wheel suspension may be a wheel suspension for a wheel, in particular a steered wheel, which is driven by a wheel hub drive.

The partial control arms, in particular each partial control arm, may be connected or connectable, on the one hand, to a partial control arm connecting joint of the control arm base. On the other hand, the partial control arms may be connected or connectable to a wheel connecting joint for the articulated connection of the control arm to the wheel, in particular on the wheel side. The partial control arms may be connected or connectable to the wheel via a shared wheel connecting joint or, separately from each other, via an (independent) wheel connecting joint.

Within the scope of one preferred specific embodiment, at last one of the partial control arms is pivotable around a pivot axis. In particular, at least one of the partial control arms may be pivotable around a (kinematic) pivot axis extending between the wheel connecting joint and the partial control arm connecting joint of the partial control arm. In particular, at least one part of the at least one pivotable partial control arm may be designed to be situated, in particular completely, at a distance from the pivot axis. Due to a control arm designed in this manner, the maneuverability of the vehicle may be advantageously improved.

The control arm according to the present invention is advantageous, in particular, for steerable wheels driven by a wheel hub drive, since they may be driven without a drive shaft, and the driving forces may act in the direction of the steering direction, and thus have the potential to implement very large steering angles. However, this potential may not be utilized with the aid of conventional wheel suspensions, since at large steering angles, the wheel in such suspensions would collide with the control arm of the wheel suspension.

Due to the fact that at least one part of the pivotable partial control arm is designed to be situated at a distance from the pivot axis, the pivotable partial control arm may evade the wheel when the wheel is steered by a pivoting movement, so that the steering angle of the wheel may be increased. On the whole, very large maximum steering angles of, for example, up to 70°, 80°, 85°, 90° and even more than 90° may thus be achieved. Thus, the maneuverability or agility of the vehicle may be advantageously improved. The parking of the vehicle may be simplified just with the aid of one partial control arm designed in this manner, for example due to a parallel steering of all wheels of the front axle and the rear axle by 90°. With the aid of two partial control arms designed in this manner, the maximum steering angle in both steering directions may be advantageously increased, whereby the maneuverability or agility may be further increased, the turning clearance circle of the vehicle reduced and significant changes in the driving direction facilitated.

Due to a maximum steering angle of more than 90°, which is achievable with the aid of the control arm according to the present invention, it may even be advantageously possible to cause a vehicle having an unsteered rear axle to rotate around the middle of the rear axle, while maintaining the Ackerman conditions (all projected wheel axles intersect in the curve center point). The inner-curve wheel would then have a steering angle of 90°+x, and the more cornering wheel would have a steering angle of 90°−x, x being a function of the wheel track, the wheel base and, if necessary, the kingpin offset of the vehicle. In vehicles having a steered front axle and a steered rear axle, it would even be possible for the vehicle to turn, for example, around the vehicle middle.

In addition, a wheel suspension having a control arm according to the present invention may be less complex and thus more cost-effective and reliable than a wheel suspension having an electric actuator, including a gear and control module(s). Furthermore, a wheel suspension having a control arm according to the present invention may have a comparatively low weight.

The partial situating of the at least one pivotable partial control arm at a distance from the pivot axis may be accomplished with the aid of two-dimensional or three-dimensional shaping of the pivotable partial control arm.

Within the scope of one specific embodiment, the at least one pivotable partial control arm includes at least one inflexible partial control arm segment, which has an at least partially (singly or multiply) angled and/or partially (singly or multiply) bent design. Thus, for example, it may be possible to implement at least one part of the pivotable partial control arm situated at a distance from the pivot angle, in particular in the area of the angling or the bending. For example, the inflexible partial control arm segment may have an essentially U-shaped or bow-shaped design. If necessary, the at least one pivotable partial control arm may be designed in the form of an inflexible partial control arm segment, which has an at least partially (singly or multiply) angled and/or partially (singly or multiply) bent design, for example, an essentially U-shaped or bow-shaped design.

Within the scope of another alternative or additional specific embodiment, the at least one pivotable partial control arm includes at least two inflexible partial control arm segments, which are connected by a flexible connecting element, in particular, at an angle to each other. It is thus also possible to implement at least one part of the pivotable partial control arm situated at a distance from the pivot axis, in particular, in the area of the flexible connecting element. If necessary, the pivotable partial control arm may include two inflexible partial control arm segments, which are connected, for example, at an angle to each other.

The flexible connecting element may be a joint or a combination of two or more joints.

Within the scope of a special design of this specific embodiment, the flexible connecting element of the at least one partial control arm is a ball joint.

It is possible, in principle, to induce the pivoting movement of the at least one pivotable partial control arm in different ways.

Within the scope of one preferred specific embodiment, however, the at least one pivotable partial control arm is connected by a wheel coupling, for example a wheel support coupling, to a component which completes the movement associated with a steering movement of the wheel. Thus, a movement of the partial control arm coupled to the steering movement of the wheel may be advantageously induced. The component may be, for example, the wheel, in particular, the wheel support, a steering gear for steering the wheel or an actuator for steering the wheel. Due to the fact that the at least one partial control arm is actuated by the wheel coupling, additional components for actuating the wheel coupling may be advantageously dispensed with, and the manufacturing costs and the energy efficiency may thus be improved.

Within the scope of another preferred specific embodiment, the control arm includes at least two pivotable partial control arms. In particular, the control arm may include a first partial control arm and a second partial control arm, the first partial control arm being pivotable around a pivot axis extending between the wheel connecting joint and the partial control arm connecting joint of the first partial control arm, and at least one part of the first partial control arm being situated at a distance from the pivot axis of the first partial control arm, and the second partial control arm being pivotable around a pivot axis extending between the wheel connecting joint and the partial control arm connecting joint of the second partial control arm, and at least one part of the second partial control arm being situated at a distance from the pivot axis of the second partial control arm. The first partial control arm may include at least one inflexible partial control arm segment, which has an at least partially angled and/or partially bent design, and/or at least two inflexible partial control arm segments, which are connected by a flexible connecting element, for example, a ball joint, in particular, at an angle to each other. The second partial control arm may also include at least one inflexible partial control arm segment, which has an at least partially angled and/or partially bent design, and/or at least two inflexible partial control arm segments, which are connected by a flexible connecting element, for example a ball joint, in particular, at an angle to each other. The at least one partial control arm, in particular, the at least two partial control arms, for example, the first and/or second partial control arm(s), may be pivotable from a first position, in particular, in which the at least one part situated at a distance is oriented essentially vertically into a second position, in particular, in which the at least one part situated at a distance is oriented essentially horizontally, during a transition of the wheel from an unturned-in position to a maximum turned-in position, whereby in the second position, in particular, it is possible for a space surrounded by the at least one part situated at a distance to be accommodated by the wheel. The at least one partial control arm, in particular the at least two partial control arms, for example, the first and/or the second partial control arm(s), may have, for example, an essentially U-shaped or bow-shaped design, whereby in particular the pivot axis may extend along the opening of the U or the bow. Essentially vertical or essentially horizontal—in addition to the vertical or horizontal—may also be understood to be orientations which deviate from the vertical or horizontal by, for example, up to ±20°.

If the control arm includes at least two pivotable partial control arms, for example, a first pivotable partial control arm and/or a second pivotable partial control arm, at least one of the pivotable partial control arms, for example, the first pivotable partial control arm and/or the second pivotable partial control arm, is preferably connected by a wheel coupling to a component which completes a movement associated with a steering movement of the wheel.

In principle, it is possible in such case to connect the pivotable partial control arms individually or separately from each other with the aid of multiple wheel couplings, for the purpose of inducing a movement of the partial control arms in the same direction.

To simply hold the control arm, however, it is sufficient to connect (only) one of the pivotable partial control arms, with the aid of the wheel coupling, to the component, which completes a movement associated with a steering movement of the wheel, it being possible to induce a movement of the one or the other partial control arm in the same direction with the aid of one or multiple control arm couplings. Thus, the effect may be advantageously achieved that the one or the other pivotable partial control arm(s) carries out a "corresponding" movement with the steering wheel and completes an evasive movement.

Within the scope of another preferred specific embodiment, the control arm therefore includes a control arm coupling, with the aid of which at least two pivotable partial control arms may be connected to each other, in particular, in an articulated manner. The control arm coupling may connect, in particular, the flexible connecting elements of two pivotable partial control arms.

The partial control arms may include a shared wheel-side pivot and may be connected to the wheel support of the wheel, for example, directly or indirectly in an articulated manner.

Within the scope of one specific embodiment, the control arm includes a wheel connecting joint, via which the partial control arms (together) are connected to the wheel. For example, the first partial control arm, on the one hand, may be connected to a wheel connecting joint, to which the second partial control arm is also connected. On the other hand, the first and the second partial control arms may each be connected separately from each other to an (independent) partial control arm connecting joint. The wheel connecting joint may be, for example, an individual joint, in particular, a ball joint. However, it is also possible to design the wheel connecting joint as a multi-articulated assembly, which, for example, includes a ball joint and two rotational joints, the assembly being connectable in an articulated manner to the wheel with the aid of the ball joint and connected in an articulated manner to the partial control arms with the aid of the rotational joints.

However, it is also possible for the partial control arms to have two separate, wheel-side pivots.

Within the scope of another specific embodiment, the control arm therefore includes multiple, in particular two, wheel connecting joints, the partial control arms each being connectable to the wheel separately from each other via a wheel connecting joint. The wheel connecting joints may be, for example, ball joints. For example, the first partial control arm may be connected to an (independent) wheel connecting joint, on the one hand, and to an (independent) partial control arm connecting joint, on the other hand, the second partial control arm also being connected to an (independent) wheel connecting joint, on the one hand, and to an (independent) partial control arm connecting joint, on the other hand.

The one or multiple wheel connecting joint(s) may be designed both for supporting and for guiding the wheel. The one or multiple wheel connecting joint(s) may therefore also be referred to as wheel guiding joints and/or supporting joints.

The partial control arm connecting joints may also be individual joints, for example, ball joints, or joint combinations, for example, combinations of two rotational joints.

Due to the fact that the partial control arms are rotatably supported by the one or multiple wheel connecting joint(s) and the partial control arm connecting joints, they are able to pivot around their longitudinal axis.

Within the scope of another specific embodiment, the distance between the at least one part of the pivotable partial control arm situated at a distance from the pivot axis and the pivot axis of the pivotable partial control arm is ≥2 cm, in particular ≥5 cm, for example ≥10 cm, for example from ≥5 cm or ≥10 cm to ≤100 cm (passenger car/commercial vehicle) or ≤30 cm (passenger car), for example approximately 16 cm (passenger car). If the control arm includes a first and a second pivotable partial control arm, the distance between the at least one part of the first partial control arm situated at a distance from the pivot axis of the first partial control arm and the pivot axis of the first partial control arm, as well as the distance between the at least one part of the second partial control arm situated at a distance from the pivot axis of the second partial control arm and the pivot axis of the second partial control arm may be ≥2 cm, in particular ≥5 cm, for example ≥10 cm, for example from ≥5 cm or ≥10 cm to ≤100 cm (passenger car/commercial vehicle) or ≤30 cm (passenger car), for example approximately 16 cm (passenger car). In this case, the distance of the first partial control arm may be, in particular, different from the distance of the second partial control arm.

The part of the at least one pivotable partial control arm situated at a distance from the pivot axis may extend over a length of ≥5 cm, in particular ≥10 cm, for example ≥15 cm or ≥30 cm, for example from ≥5 cm or ≥10 cm or ≥15 cm or ≥30 cm to ≤100 cm (truck/commercial vehicle) or ≤50 cm (passenger car) or ≤40 cm, for example approximately 25 cm (passenger car), in particular, at least at a distance specified above from the pivot axis. If the control arm includes a first and a second pivotable partial control arm, the part of the first partial control arm situated at a distance from the pivot axis of the first partial control arm, as well as the part of the second partial control arm situated at a distance from the pivot axis of the second partial control arm, may extend over a length of ≥5 cm, in particular ≥10 cm, for example ≥15 cm or ≥30 cm, for example from ≥5 cm or ≥10 cm or ≥15 cm or ≥30 cm to ≤100 cm (truck/commercial vehicle) or ≤50 cm (passenger car) or ≤40 cm, for example approximately 25 cm (passenger car), in particular at least at a distance specified above from the particular pivot axis. The length of the first partial control arm may be, in particular, different from the length of the second partial control arm.

The control arm may be a lower and/or an upper control arm.

The present invention furthermore relates to a vehicle, in particular having at least one wheel driven by a wheel hub drive, which includes a control arm base according to the present invention and/or a wheel suspension according to the present invention. The vehicle may be, in particular, a motor vehicle, for example an electric vehicle, in particular having a wheel hub drive. For example, the vehicle may be a city vehicle having a wheel hub drive, a passenger car, a truck or a commercial vehicle.

BRIEF DESCRIPTION OF THE DRAWINGS

The present invention is explained by way of example below on the basis of preferred exemplary embodiments with reference to the appended drawings, the features illustrated below being able to represent one aspect of the present invention, both individually and in combination.

DETAILED DESCRIPTION

Figure 1:
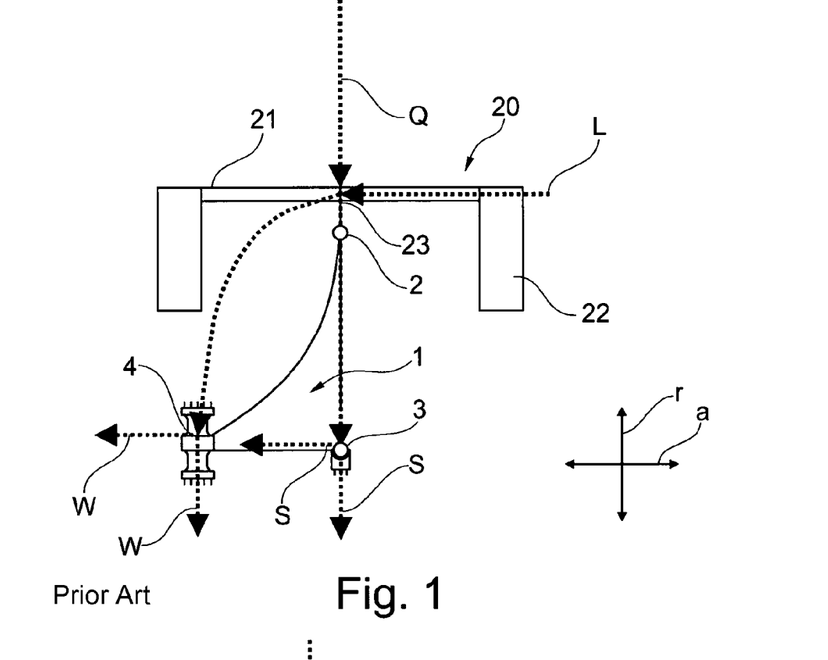
FIG. 1 shows a schematic view of a conventional, undivided control arm.

FIG. 1 shows an undivided control arm 1 of a conventional wheel suspension, such as a MacPherson wheel suspension. FIG. 1 shows that control arm 1 has an asymmetrical, essentially triangular, shape and includes a total of three joints 2, 3, 4.

A ball joint 2 is used for the articulated connection of wheel 20. FIG. 1 shows that ball joint 2 is connected to a wheel support 23, on which wheel rim 21 and tire 22 are mounted.

Adjacent to wheel-side ball joint 2, control arm 1 includes a vehicle-side ball joint 3. In addition, the control arm includes another vehicle-side joint 4 in the form of a rubber joint.

The dotted arrows illustrate a highly schematic view of forces acting upon wheel 20, the control arm and its joints 2, 3, 4. A longitudinal force L and a transverse force Q act upon wheel 20, which are transmitted to control arm 1 and its joints 2, 3, 4.

FIG. 1 illustrates that, to achieve a preferably high transverse rigidity, vehicle-side ball joint 3, which is adjacent to wheel side ball joint 2, is designed to be inflexible S axially a and radially r to the vehicle longitudinal direction. Vehicle-side rubber joint 4 in this case is used to implement a certain axial a and also radial r elasticity with respect to the vehicle longitudinal direction.

Figure 2:
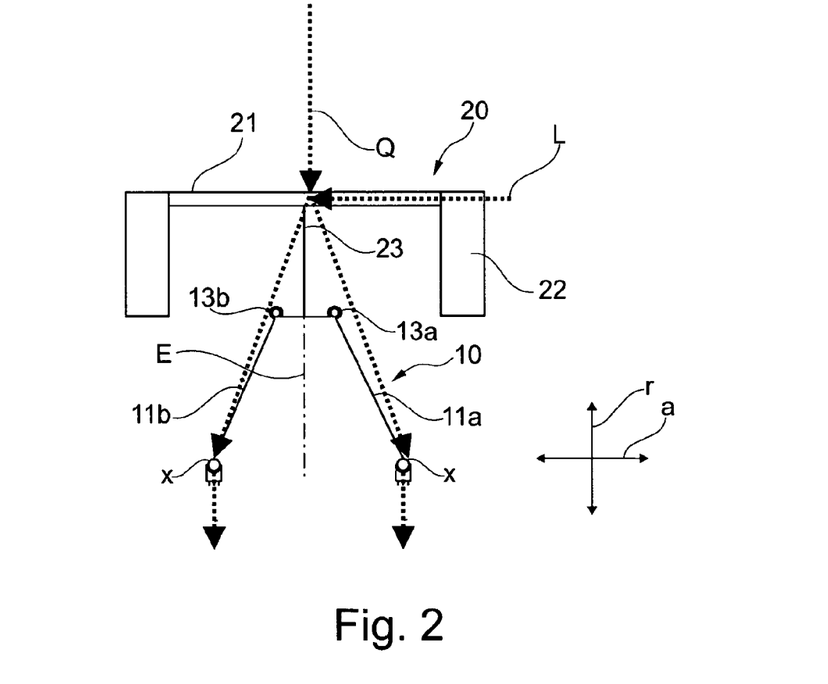
FIG. 2 shows a schematic view of a divided control arm, including two pivotable partial control arms.

FIG. 2 shows a so-called divided control arm 10, which includes two partial control arms 11a, 11b. FIG. 2 illustrates that partial control arms 11a, 11b are each connected on one side to wheel support 23 via a ball joint 13a, 13b. On the other side, partial control arms 11a, 11b are each connected separately from each other to a vehicle-side joint x, which is illustrated by way of example as a ball joint. Partial control arms 11a, 11b are situated essentially mirror-symmetrically, mirror plane E being situated perpendicularly to the axis running through vehicle-side joints x and centrally between vehicle-side joints x. One or both partial control arm(s) 11a, 11b may be designed to be pivotable around a pivot axis, for example, to evade wheel 20 when it turns in, and to thereby increase the maximum steering angle of wheel 20.

It is apparent from FIG. 2 that, in the case of a divided control arm 10, which includes two partial control arms 11a, 11b, the division shown in FIG. 1 of joints x into an elastic 4 W,W joint and an inflexible 3, S,S joint is no longer possible, since essential parts of both joints x are then involved in influencing the longitudinal and transverse rigidity and would thus have to be inflexible and elastic at the same time, which is almost impossible to implement by using simple, conventional joints such as simple ball joints, etc.

Figure 3:
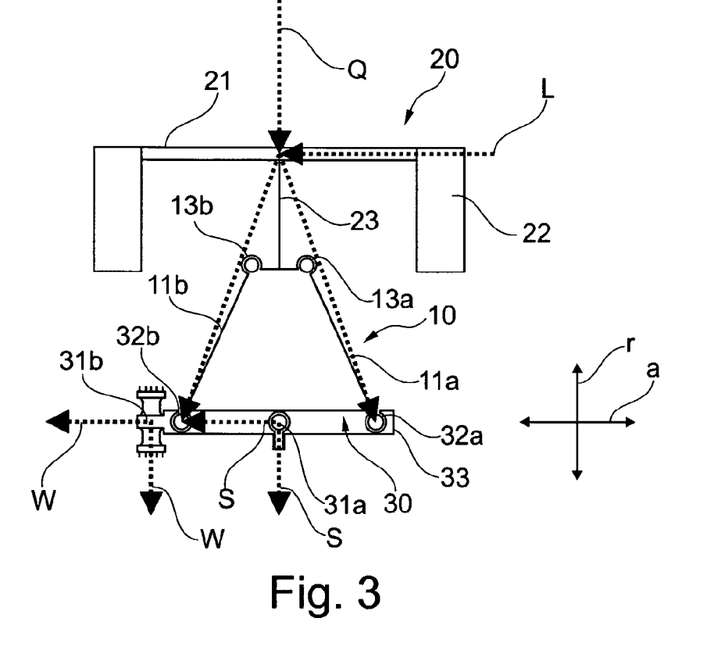
FIG. 3 shows a schematic view of a divided control arm, including two pivotable partial control arms and a first specific embodiment of a control arm base according to the present invention.

FIG. 3 shows a first specific embodiment of a control arm base 30 according to the present invention for achieving the object of distributing the longitudinal and transverse rigidity explained in connection with FIG. 2.

FIG. 3 shows that control arm base 30 includes two vehicle connecting joints 31a, 31b for the articulated connection of control arm base 30 to the vehicle, and two partial control arm connecting joints 32a, 32b for the articulated connection for one of partial control arms 11a, 11b, in particular pivotable partial control arms, to control arm base 30. Partial control arms 11a, 11b in this case are each connected, on the one hand, to one of partial control arm connecting joints 32a, 32b of control arm base 30. Within the scope of the illustrated specific embodiment, partial control arms 11a, 11b are connected, on the other hand, in each case to wheel support 23 via a wheel connecting joint 13a, 13b.

FIG. 3 illustrates that control arm base 30 includes a control arm base main body 33, vehicle connecting joints 31a, 31b being situated on one side of control arm base main body 33 and partial control arm connecting joints 32a, 32b being situated on the opposite side of control arm base 30.

FIG. 3 illustrates that, due to control arm base 30, it is possible to connect divided control arm 10 to the vehicle and, in so doing, to implement the vehicle-side connection of control arm base 30 as well as the division or design of its vehicle connecting joints 31a, 31b similarly to the joint division shown in FIG. 1 and, in particular, using simple, conventional joints.

Within the scope of the first specific embodiment shown in FIG. 3, the one vehicle connecting joint 31a is designed in the form of a ball joint, which is inflexible S,S radially r and axially a to the vehicle longitudinal direction. The other vehicle connecting joint 31a is designed in the form of a rubber joint, which is flexible W,W radially r and axially a to the vehicle longitudinal direction. The division of vehicle-side joints 31a, 31b into an elastic joint 31b, W,W and an inflexible joint 31a, S,S thus corresponds to the division shown in FIG. 1.

FIG. 3 furthermore shows that, within the scope of the first specific embodiment, of the two vehicle connecting joints 31a, 31b, radially inflexible vehicle connecting joint 31a is the one adjacent to wheel support 23 or near the wheel support and is situated, in particular, opposite wheel support 23 and between the two partial control arm connecting joints 32a, 32b, the other axially flexible vehicle connecting joint 31b being situated outside the two partial control arm connecting joints 32a, 32b, which has an advantageous effect on the transverse rigidity.

Figure 4:
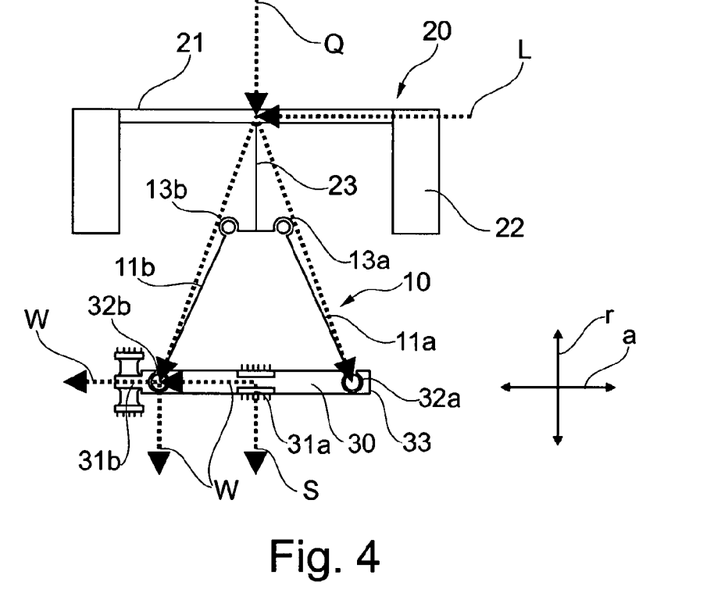
FIG. 4 shows a schematic view of a divided control arm, including two pivotable partial control arms and a second specific embodiment of a control arm base according to the present invention.

The second specific embodiment illustrated in FIG. 4 of a control arm base 30 according to the present invention essentially differs from the first specific embodiment illustrated in FIG. 3 only in that, instead of the ball joint, a sliding joint 31a is used as the radially r inflexible vehicle connecting joint, which is axially a flexible, in particular movable, in contrast to the ball joint, which is also axially a inflexible.

Figure 5:
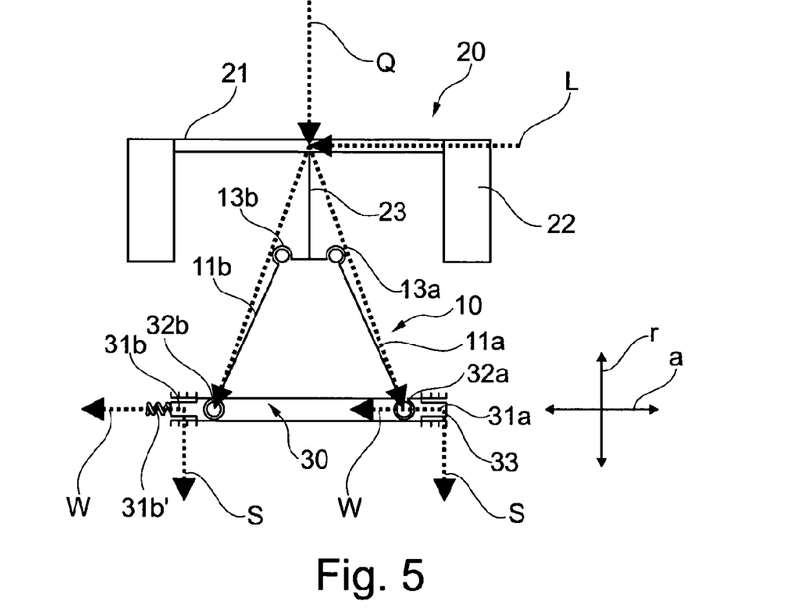
FIG. 5 shows a schematic view of a divided control arm, including two pivotable partial control arms and a third specific embodiment of a control arm base according to the present invention.

The third specific embodiment illustrated in FIG. 5 of a control arm base 30 according to the present invention differs from the first specific embodiment illustrated in FIG. 3, on the one hand, in that the two vehicle connecting joints 31a, 31b are situated outside the two partial control arm connecting joints 32a, 32b and thus also not opposite wheel support 23. Unlike the illustration in FIG. 6, the two vehicle connecting joints 31a, 31b may also be situated asymmetrically.

On the other hand, the third specific embodiment illustrated in FIG. 5 of a control arm base 30 according to the present invention differs from the first specific embodiment illustrated in FIG. 3, in that both vehicle connecting joints 31a, 31b are designed as radially r inflexible S and axially a flexible W, in particular movable, sliding joints or rotational sliding joints. In particular, the two vehicle connecting joints 31a, 31b may be sliding joints, since control arm base 30 does not absolutely have to be rotatable.

The third specific embodiment illustrated in FIG. 5 of a control arm base 30 according to the present invention furthermore differs from the first specific embodiment illustrated in FIG. 3, in that an axial a elasticity of the arrangement is implemented by an additional elastic element 31b' in the form of a spring and not by a rubber joint. The advantage of this is that the elasticity of resilient element 31b' may be set independently of joints 31a, 31b.

Figure 6:
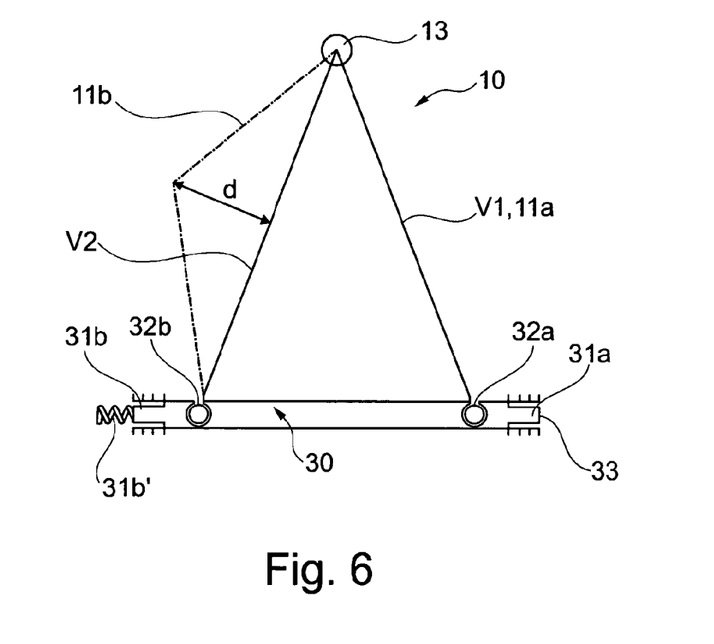
FIGS. 6-8 show schematic drawings to illustrate different specific embodiments of control arms.
Figure 7:
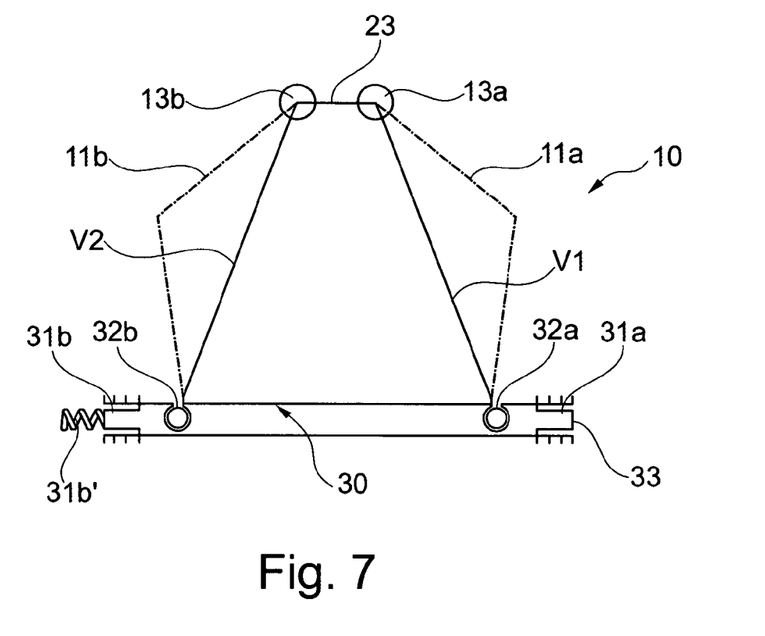
Figure 8:
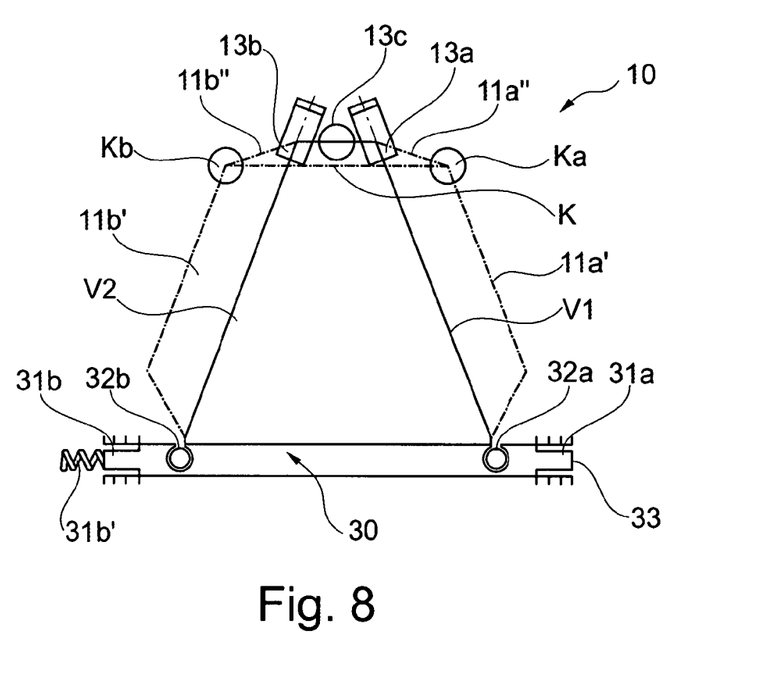

FIGS. 6 through 8 are highly schematic sketches for illustrating different specific embodiments of wheel suspensions, which are equipped with the specific embodiment illustrated in FIG. 5 of a control arm base 30 according to the present invention as well as a divided control arm, which includes one or two pivotable partial control arms 11a, 11b. Pivotable partial control arms 11a, 11b are illustrated therein by dashed lines. The dashed lines in this case indicate the shape of the pivotable partial control arms and are intended to show that pivotable partial control arms 11a, 11b may be partially provided above and/or below the plane of the page. Viewed three-dimensionally, the illustrated fulcrums may also be situated above and/or below the plane of the page. To be able to represent angles and bulges of pivotable partial control arms 11a, 11b, which may be situated above or below the plane of the page, each of these elements is illustrated in the outer area of the sketches. However, this should not be interpreted to mean that the angles and bulges of pivotable partial control arms 11a, 11b have to be provided in different directions.

In FIGS. 6 through 8, the solid lines illustrate pivot axes V1, V2 of pivotable partial control arms 11a, 11b and, in this case, may correspond to an idealized projection of pivotable partial control arms 11a, 11b.

In FIG. 6, one of solid lines V2 also illustrates the pivot axis and idealized projection of a pivotable partial control arm 11b. The other solid line V1, 11a shows that it is possible to design the other partial control arm 11a to be either essentially straight and, for example, rotatable, or also pivotable.

FIG. 6 shows one specific embodiment of a divided control arm 10, which includes two partial control arms 11a, 11b, in which partial control arms 11a, 11b have a shared wheel-side pivot 13, which may coincide with the pivot of the wheel support of the wheel. Partial control arms 11a, 11b are, on the one hand, each connected separately from each other to one of partial control arm connecting joints 32a, 32b of control arm base 30, in particular, in the form of a ball joint. On the other hand, partial control arms 11a, 11b are connected to a shared wheel connecting joint 13.

In the specific embodiment shown in FIG. 6, only first partial control arm 11b is designed in such a way that one part of partial control arm 11b is situated at a distance d from a pivot axis V2, which extends between wheel connecting joint 13 and partial control arm connecting joint 32b of partial control arm 11b, and around which partial control arm 11b is pivotable. In this case, wheel connecting joint 13 and partial control arm connecting joint 32b, which connects control arm base 30 and first partial control arm 11b in an articulated manner, are ball joints. The partial spacing of first partial control arm 11b is achieved in that first partial control arm 11b is based on a single-angled, inflexible partial control arm segment. Factors such as the maximum steering angle, the caster angle, the spread angle, the kinematics of the coupling of the evasive movement, the strength, the manufacturing process, etc., may be taken into account in the precise shaping of pivotable partial control arm 11b. Due to a pivoting movement of this partial control arm 11b around pivot axis V2, the part of first partial control arm 11b situated at a distance may evade the wheel, and a high maximum steering angle of the wheel may thereby be achieved in this steering direction. If an average maximum steering angle is also sufficient in the other steering direction, for example, if the control arm is used only to simplify lateral parking, for example, with four parallel turned-in wheels, an increase in the maximum steering angle in only one steering angle is sufficient. It is therefore possible to design second partial control arm 11a to be straight.

To increase the maximum steering angle in both steering directions, for example, to increase the agility of the vehicle and to improve the turning clearance circle of the vehicle, in the specific embodiments illustrated in FIGS. 7 and 8, both first partial control arm 11b and second partial control arm 11a are designed in such a way that one part of partial control arm 11a, 11b is situated at a distance d from pivot axis V2, V1, which extends between wheel connecting joint 13b, 13a and respective partial control arm connecting joint 32b, 32a of control arm base 30, and around which particular partial control arm 11a, 11b is pivotable.

In the specific embodiment illustrated in FIG. 7, the control arm includes two partial control arms 11a, 11b, which, on the one hand, are each connected separately from each other to a wheel connecting joint 13a, 13b for the articulated connection of the control arm to a wheel and, on the other hand, are each connected, also separately from each other, to a partial control arm connecting joint 32a, 32b of control arm base 30. Due to the two wheel connecting joints 13a, 13b, it is possible, in particular, to generate a virtual pivot—similar to a four-link suspension.

Within the scope of the specific embodiment illustrated in FIG. 7, the partial spacing of first partial control arm 11b and second partial control arm 11a is achieved, as in the specific embodiment illustrated in FIG. 6, in that partial control arms 11a, 11b each have a single-angled, inflexible partial control arm segment.

FIG. 8 shows one specific embodiment of a divided control arm, including a first partial control arm 11b, 11b', 11b" and a second partial control arm 11a, 11a', 11a". The two partial control arms 11b, 11b', 11b"; 11a, 11a', 11a" in this case are, on the one hand, connected together to a multi-articulated wheel connecting joint 13a, 13b, 13c for the articulated connection of the control arm to a wheel. On the other hand, the two partial control arms 11b, 11b', 11b"; 11a, 11a', 11a" are each connected separately from each other to one of partial control arm connecting joints 32b, 32a of the control arm base. The wheel connecting joint 13a, 13b, 13c is designed in the form of a multi-articulated assembly 13a, 13b, 13c, which includes a ball joint 13c and two rotational joints 13b, 13a, assembly 13a, 13b, 13c being connectable in an articulated manner to the wheel with the aid of ball joint 13c, and being connected in an articulated manner to one of partial control arms 11b, 11b', 11b"; 11a, 11a', 11a" with the aid of rotational joints 13b, 13a.

First partial control arm 11b, 11b', 11b" in this case is designed in such a way that a part of first partial control arm 11b, 11b', 11b" is situated at a distance d from pivot axis V2, which extends between wheel connecting joint 13a, 13b, 13c and the one partial control arm connecting joint 32b of control arm base 30, to which first partial control arm 11b, 11b', 11b" is connected, and around which first partial control arm 11b, 11b', 11b" is pivotable. Likewise, second partial control arm 11a, 11a', 11a" is designed in such a way that a part of second partial control arm 11a, 11a', 11a" is situated at a distance d' from pivot axis V1, which extends between wheel connecting joint 13a, 13b, 13c and partial control arm connecting joint 32a of control arm base 30, to which the second partial control arm is connected, and around which second partial control arm 11a, 11a', 11a" is pivotable.

First partial control arm 11b, 11b', 11b" in this case is formed by a straight partial control arm segment 11b", an angled partial control arm segment 11b' and a flexible connecting element Kb, in particular in the form of a ball joint, flexible connecting element Kb connecting straight partial control arm segment 11b" to angled partial control element segment 11b' at an angle to each other. The overall result is a U-shaped or bow-shaped design of first partial control arm 11b, 11b', 11b". Second partial control arm 11a, 11a', 11a" in this case is also formed by a straight partial control arm segment 11a", an angled partial control arm segment 11a' and a flexible connecting element Ka, in particular in the form of a ball joint, flexible connecting element Ka connecting straight partial control arm segment 11a" to angled partial control element segment 11a' at an angle to each other. The overall result is also a U-shaped or bow-shaped design of second partial control arm 11a, 11a', 11a".

The control arm also includes a control arm coupling K, which connects first partial control arm 11b, 11b', 11b" and second partial control arm 11a, 11a', 11a" via their flexible connecting elements Kb, Ka.

Figure 9A:
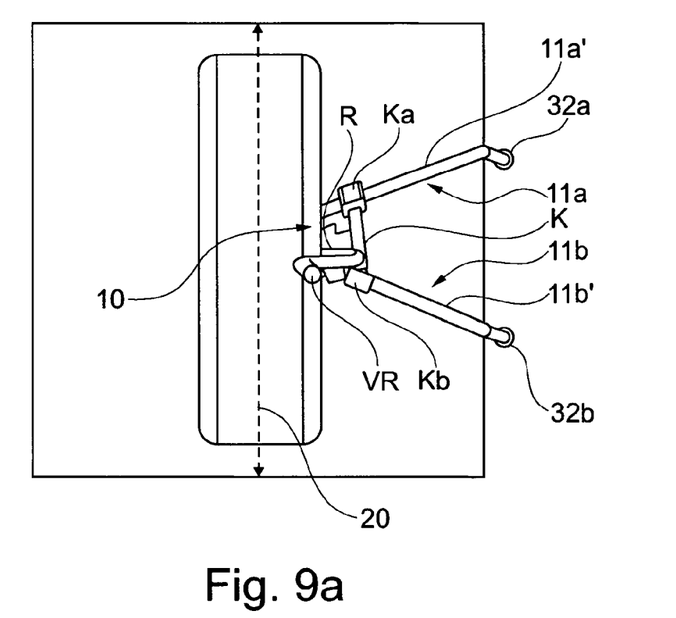
FIG. 9a shows a schematic top view from above of an unturned-in, left front wheel of a vehicle, which is equipped with a special design of the specific embodiment illustrated in FIG. 8 of a control arm according to the present invention.
Figure 9B:
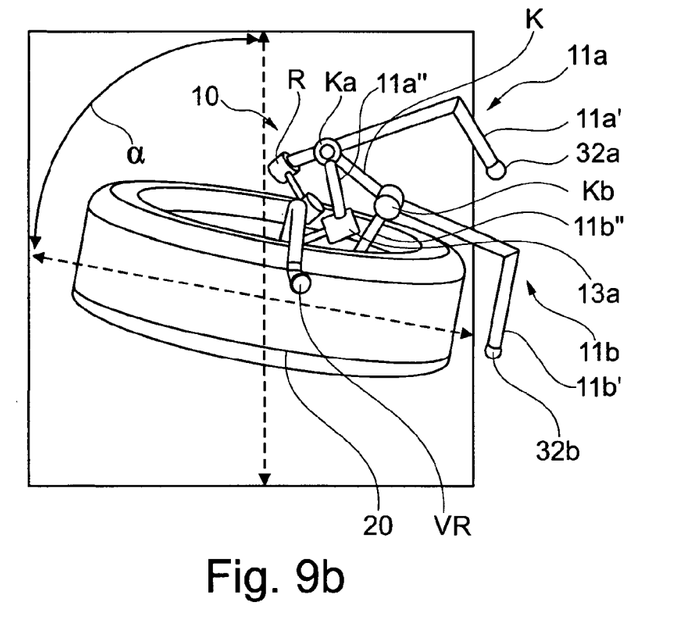
FIG. 9b shows a schematic top view of the embodiment illustrated in FIG. 9a in the turned-in state.

FIGS. 9a and 9b show a left front wheel 20 of a vehicle, which is equipped with a special design of the specific embodiment of a control arm outlined in FIG. 8.

FIGS. 9a and 9b are schematic top views of front wheel 20 from above. FIG. 9a shows front wheel 20 in an unturned-in state, for example while driving straight ahead, FIG. 9b showing front wheel 20 in the maximum turned-in state. FIG. 9b shows, in particular, that a maximum steering angle α of nearly 90° may be implemented, due to the illustrated design.

FIG. 9a shows, in particular, that control arm 10 includes a rear partial control arm 11b, 11b', 11b" and a front partial control arm 11a, 11a', 11a". Rear partial control arm 11b, 11b', 11b" in this case is connected to a first partial control arm connecting joint 32b in the form of a ball joint, front partial control arm 11a, 11a', 11a" being connected to a second partial control arm connecting joint 32a in the form of a ball joint.

FIGS. 9a and 9b illustrate that the two partial control arms 11b, 11b', 11b"; 11a, 11a', 11a" have an essentially U-shaped or bow-shaped design. During the transition from the unturned-in position to the maximum turned-in position of the wheel, the two U-shaped partial control arms 11b, 11b', 11b"; 11a, 11a', 11a" are pivoted from an essentially vertical position around an axis extending along the opening of U-shaped partial control arms 11b, 11b', 11b"; 11a, 11a', 11a" into an essentially horizontal position, wheel 20 being able to pass through the opening of one of U-shaped partial control arms 11b, 11b', 11b" and enter the space surrounded by this partial control arm 11*b*, 11*b*', 11*b*". When steered in the other steering direction, wheel 20 may pass through the opening of other U-shaped partial control arm 11*a*, 11*a*', 11*a*" and enter the space surrounded by this partial control arm 11*a*, 11*a*', 11*a*". The maximum steering angle of wheel 20 may thus be significantly increased in both steering directions.

FIGS. 9*a* and 9*b* illustrate that both rear partial control arm 11*b*, 11*b*', 11*b*" and front partial control arm 11*a*, 11*a*', 11*a*" are each formed by a straight partial control arm segment 11*b*'", 11*a*'", an angled partial control arm segment 11*b*', 11*a*' and a flexible connecting element Kb, Ka in the form of a ball joint, flexible connecting element Kb, Ka each connecting straight partial control arm segment 11*b*'", 11*a*'" to angled partial control element segment 11*b*', 11*a*' at an angle to each other, resulting in the U-shaped or bow-shaped design.

FIGS. 9*a* and 9*b* also illustrate that rear partial control arm 11*a* and front partial control arm 11*b* are each connected to respective partial control arm connecting joint 32*b*, 32*a* of the control arm base (not illustrated) with the aid of angled partial control arm segment 11*b*', 11*a*'.

FIGS. 9*a* and 9*b* also illustrate that rear partial control arm 11*b* and front partial control arm 11*a* are each connected by straight partial control arm segment 11*b*', 11*a*' to a rotational joint 13*b*, 13*a* of a wheel connecting joint 13*a*, 13*b*, 13*c*, which is designed in the form of a multi-articulated assembly 13*a*, 13*b*, 13*c*, which includes a ball joint 13*c* and two rotational joints 13*a*, 13*b*, and which is connected to the wheel support of wheel 20 in an articulated manner by ball joint 13*c*.

FIGS. 9*a* and 9*b* also illustrate that the pivot axis of rear partial control arm 11*b* extends between wheel connecting joint 13*b* and partial control arm connecting joint 32*b* of rear partial connecting arm 11*b*, and the pivot axis of front partial connecting arm 11*a* extends between wheel connecting joint 13*a* and partial control arm connecting joint 32*a* of front partial control arm 11*a*. Partial control arms 11*b*, 11*a* are designed to be partially situated at a substantial distance from the respective pivot axis.

In addition, FIGS. 9*a* and 9*b* show that control arm 10 includes a control arm coupling K, which connects first partial control arm 11*b* and second partial control arm 11*a* via their flexible connecting elements Kb, Ka. In addition, FIGS. 9*a* and 9*b* show that front partial control arm 11*a* is coupled to wheel support 23 of wheel 20 via a wheel coupling R. Due to wheel coupling R, a steering movement of wheel 20 may be translated into a pivoting movement of front partial control arm 11*a* and, via control arm coupling K, also into a pivoting movement of rear partial control arm 11*b*.

FIGS. 9*a* and 9*b* also outline the fact that the front wheel may include a vertical wheel guide VR, which, however, is only illustrated in a highly schematic manner, in the interest of clarity.

LIST OF REFERENCE NUMERALS

L Longitudinal force
Q Transverse force
a Axially to the vehicle longitudinal direction
r Radially to the vehicle longitudinal direction
W Flexible
S Inflexible
α Maximum steering angle
1 Conventional control arm
2 Wheel-side ball joint
3 Vehicle-side ball joint adjacent to the wheel-side joint
4 Vehicle-side rubber joint
10 Control arm, in particular, divided control arm
11*a*, 11*b* Partial control arm
13, 13*a*, 13*b*, 13*c* Wheel connecting joint of the partial control arm
x Joint for vehicle-side connection
V1, V2 Pivot axis of the partial control arm
E Mirror plane
d Distance between spaced partial control arm part and pivot axis
11*a*', 11*a*" Inflexible partial control arm segment
11*b*', 11*b*" Inflexible partial control arm segment
Ka, Kb Ball joint of the partial control arm
K Control arm coupling
R Wheel coupling
VR Vertical wheel guide
20 Wheel
21 Rim
22 Tire
23 Wheel support
30 Control arm base
31*a* Radially inflexible vehicle connecting joint
31*b* Axially flexible vehicle connecting joint
31*b*' Additional elastic element
32*a*, 32*b* Partial control arm connecting joints
33 Control arm base main body

What is claimed is:

1. A control arm base for connecting a divided control arm for a wheel to a vehicle, the control arm including at least two partial control arms, the at least two partial control arms connectable, on one end, to a vehicle-side joint and, on an opposite end, to a wheel-side joint, the control arm base comprising:
at least two vehicle connecting joints for articulated connection of the control arm base to the vehicle; and
at least two partial control arm connecting joints for vehicle-side, articulated connection of one each of the partial control arms to the control arm base; wherein at least one of the vehicle connecting joints is a radially inflexible vehicle connecting joint designed as a sliding joint or rotational sliding joint movable axially to the vehicle longitudinal direction, and another of the vehicle connecting joints is an axially flexible vehicle connecting joint designed as a radially inflexible sliding joint or rotational sliding joint movable axially to the vehicle longitudinal direction, the control arm base including an element elastic axially to the vehicle longitudinal direction; wherein the axially elastic element is a spring.

2. A wheel suspension for a steered wheel of a vehicle, driven by a wheel hub drive, comprising:
a divided control arm for the wheel to the vehicle, the control arm including at least two partial control arms, the at least two partial control arms connectable, on one end, to a vehicle-side joint and, on an opposite end, to a wheel-side joint;
a control arm base for connecting the divided control arm for the wheel to the vehicle, the control arm base comprising:
at least two vehicle connecting joints for the articulated connection of the control arm base to the vehicle; and
at least two partial control arm connecting joints for vehicle-side, articulated connection of one each of the partial control arms to the control arm base;
wherein at least one of the vehicle connecting joints is an axially and radially flexible vehicle connecting joint, the axially and radially flexible vehicle connecting joint being an elastic flexure joint or a socket joint having an elastic socket joint, the socket joint being a sliding joint or a rotational sliding joint;
wherein at least one of the partial control arms is pivotable around a pivot axis and wherein the pivot axis extends between the partial control arm connecting joint and the wheel connecting joint of the partial control arm.

3. A wheel suspension for a steered wheel of a vehicle, driven by a wheel hub drive, comprising:
a control arm base for connecting a divided control arm for the wheel to the vehicle, the control arm including at least two partial control arms, the at least two partial control arms connectable, on one end, to a vehicle-side joint and, on the other end, to a wheel-side joint, the control arm base comprising: at least two vehicle connecting joints for articulated connection of the control arm base to the vehicle; and at least two partial control arm connecting joints for vehicle-side, articulated connection of one each of the partial control arms to the control arm base; and
the partial control arms being connected or connectable, on the one end, to one of the partial control arm connecting joints of the control arm base and, on the other end, to a wheel connecting joint for articulated connection of the control arm to the wheel; wherein at least one of the partial control arms is pivotable around a pivot axis and wherein the pivot axis extends between the partial control arm connecting joint and the wheel connecting joint of the partial control arm.

* * * * *